June 3, 1958     H. H. SISLER ET AL     2,837,409
CHLORAMINE PROCESS
Filed March 10, 1954
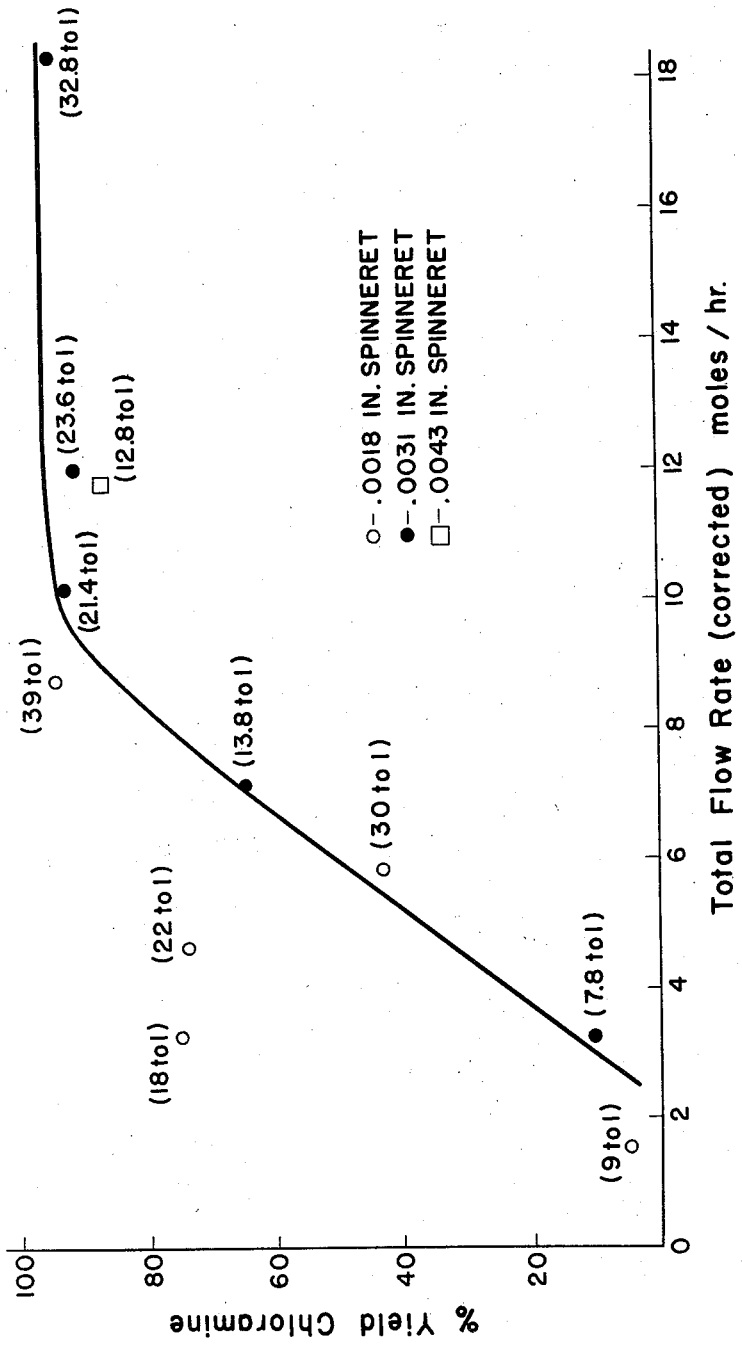
INVENTORS
HARRY H. SISLER
ROBERT MATTAIR
BY United States Patent Office 2,837,409
Patented June 3, 1958

2,837,409

CHLORAMINE PROCESS

Harry H. Sisler, Columbus, Ohio, and Robert Mattair, Niagara Falls, N. Y., assignors to The Ohio State University Research Foundation, Columbus, Ohio Application March 10, 1954, Serial No. 415,197

10 Claims. (Cl. 23—190)

This invention relates to the preparation of chloramine, and more specifically to the production of anhydrous chloramine.

This application is a continuation-in-part of our copending application Serial No. 139,098, filed January 17, 1950, now Patent No. 2,710,248, which is in turn a continuation-in-part of our application Serial No. 110,072, filed August 13, 1949, now abandoned.

The reaction of chlorine with ammonia to form chloramine has been described in the chemical literature. However, each of the methods so described is characterized by one or more of the following disadvantages: (1) the reaction is carried out in aqueous solution and an anhydrous product is not obtained; (2) the formation of undesirable side-products such as nitrogen trichloride, or dichloramine accompanies the chloramine production; (3) no distinction between monochloramine, dichloramine, and trichloramine is made; and (4) the yield of chloramine is quite low due to nitrogen formation.

One method of forming chloramine is to react sodium hypochlorite with ammonia in the presence of free alkali, as in the first step of the Raschig process of forming hydrazine. The product is an aqueous solution of monochloramine containing a large amount of caustic soda. To obtain anhydrous chloramine from such a mixture would be extremely difficult.

Because of its reactivity, monochloramine is adapted to a great number of chemical reactions. To date, it has not been used too extensively because of the difficulty of obtaining it in a proper state for such reactions.

The previously known reactions of chlorine with ammonia are the production of monochloramine, dichloramine, and trichloramine (i. e. nitrogen trichloride), as well as the production of free nitrogen. De Long (1811) by the action of chlorine on an aqueous solution of ammonium chloride obtained nitrogen trichloride as a yellow oily liquid which was violently explosive. He lost an eye and three fingers in the research. It may be presumed that heretofore workers have been deterred from research on the interaction of anhydrous ammonia and chlorine because of the vigor of the reaction and the dangers attendant upon the formation of nitrogen trichloride. We have found that if we provide a large excess of ammonia we can avoid the formation of nitrogen trichloride.

Accordingly, it is an object of the present invention to provide a method of producing anhydrous monochloramine free of undesirable reaction products or contaminants.

It is another object of this invention to provide a method of preparing anhydrous chloramine in high yield from chlorine and ammonia.

Other objects will be apparent from a reading of the following detailed description and the appended claims.

In accordance with the present invention, it is possible to prepare anhydrous chloramine by the reaction of anhydrous gaseous chlorine with anhydrous gaseous ammonia according to the following reaction:

$$2NH_3 + Cl_2 \rightarrow NH_2Cl + NH_4Cl \qquad (1)$$

This reaction produces substantially instantaneously chloramine in yields approaching 100% at ordinary temperatures. By using an excess of ammonia there is no measurable quantity of the di- or tri-chloramines and the quantity of nitrogen produced is very low.

Under the prescribed conditions, a minimum of reactants is used in the yield-reducing side reaction represented by the following equation:

$$8NH_3 + 3Cl_2 \rightarrow N_2 + 6NH_4Cl \qquad (2)$$

For the purpose of this disclosure, the term chloramine will be used to refer only to monochloramine. If the di- or tri-chloramines are intended, they will be designated as such. The use of anhydrous reactants to produce an anhydrous product is of the essence of the present invention and it should be understood that these materials are anhydrous unless otherwise specifically stated.

Because of its instability, chloramine would seldom be isolated in its pure state but would be diluted with a more stable substance. In the present method, a large excess of ammonia is always employed. This excess prevents the formation of the undesirable side products and provides a stable diluent for the chloramine. It is extremely unlikely that the chloramine would be used in a reaction which would not tolerate ammonia. However, we have been able to absorb the chloramine in dry ether and thus to obtain a dry ethereal solution of chloramine which contains only a trace of ammonia.

The present invention is carried out by introducing gaseous chlorine into a large excess of gaseous ammonia in such a manner that the reactants are immediately mixed and that the reaction products are immediately withdrawn from the reaction zone so that there is little opportunity for the chloramine to come into contact with unreacted chlorine. If desired, an inert gas may be injected into the reaction zone as a diluent to reduce the concentration of reactants and product in the mixture. The reaction mixture is withdrawn through a porous filter, such as glass wool, which removes the solid ammonium chloride from the reaction mixture.

The resulting mixture of chloramine and ammonia can be used as a source of dry chloramine in the preparation of anhydrous hydrazine as disclosed in our copending application Serial No. 415,444, filed March 10, 1954, and now abandoned, or it may be used for a variety of other chemical reactions.

In the present invention, it is important that the reaction product (chloramine) be removed from the reaction zone as rapidly as it is formed so that the possibility of contact with unreacted chlorine is substantially eliminated. Otherwise, the chloramine further reacts with chlorine to form one of the undesired side products. For this same reason, it is important that mixing of the ammonia and chlorine be accomplished as rapidly as possible.

In practice, we have found it desirable to provide an elongated reaction zone into one end of which chlorine is introduced axially, with a diluent such as nitrogen if desired. The gaseous ammonia is introduced through a series of jets spaced annularly around the axial chlorine inlet. Preferably, the chlorine and ammonia inlets should be so spaced with respect to each other that the chlorine is discharged into a moving body of ammonia. This can be accomplished very easily by having the chlorine inlet project into the reaction zone for a greater distance than do the ammonia jets with the result that chlorine is introduced downstream of the ammonia stream. This has the desired effect of producing maximum turbulence at the chlorine inlet with minimum flow of product upstream of the chlorine inlet.

We have also discovered that the presence of solid ammonium compounds in the chlorine-ammonia reaction zone results in more rapid decomposition of the chloramine. Accordingly, it is desirable to remove the ammonium chloride immediately from the reaction zone. This can be accomplished by means of electrostatic precipitators in the reaction zone or by scrapers for removing solid material from the chlorine inlet and reactor walls.

While the above Equation 1 would indicate that high yields should be obtained by using two moles of ammonia per mole of chlorine, higher ratios should be used to obtain highest yields. The desirability of such is indicated from the foregoing discussion about the reactivity of chloramine with chlorine. The excess ammonia increases the ratio of unreacted ammonia to chlorine, which increases the probability that a chlorine molecule will react with an ammonia molecule rather than with a chloramine molecule. In practice, the ratio will be between about 10 and 200 moles of ammonia per mole of chlorine.

Mixing is another important factor in the present invention. In a system where the reactants are introduced under conditions to minimize mixing, the yield of chloramine is much lower than in a system wherein the reactants are thoroughly mixed even though the ratio of reactants is the same.

The present invention will be further illustrated by certain tests which we have carried out and which are described hereafter.

CHLORAMINE FORMATION

Anhydrous chlorine and anhydrous ammonia were caused to react in gaseous phase and under different conditions to demonstrate the effect of certain conditions on the yield of chloramine. The apparatus consisted of a 50 mm. glass tube reactor approximately 65 cm. in length, and fitted at each end with a rubber stopper. At one end the rubber stopper was fitted with five 8 mm. glass tubes, one through the center and the other four symmetrically distributed around it. The center tube was slightly flared at the inner end and the outer tubes ended in jets bent to point perpendicularly toward the space immediately in front of the center tube. The outer tubes were used for the introduction of ammonia gas whereas the center tube was used for the introduction of chlorine or a mixture of chlorine with nitrogen. The center tube was fitted with a glass rod to remove plugs of ammonium chloride which formed periodically on the chlorine inlet. The reactor was packed with glass wool, loosely in the fore part of the reactor and more tightly near the outlet end. This served to completely filter out the ammonium chloride from the emergent gas stream.

The gases introduced into the reactor were metered by flow meters of the differential manometer type all of which were carefully calibrated. In addition, the chlorine entering the system was determined by the loss in weight of a small tank from which it was drawn.

The emergent gas stream was passed into a series of traps which were chilled in liquid air to liquify the condensable gases (ammonia and chloramine). All but a very small amount of the chloramine was trapped in this way. Most of this remainder was caught by bubbling the residual gases from the traps into water. The condensate was allowed to stand a sufficient period of time for the chloramine to react completely with ammonia to yield ammonium chloride. The excess liquid ammonia was then allowed to evaporate leaving in the residue chloride equivalent to the original chloramine. The weight of chlorine converted to chloride in the gas phase reaction was determined by washing the reactor walls and the glass wool plugs with water and analyzing the resulting solution for total chloride by the Volhard procedure. Most of the runs were of 15 minute duration although some were of 1 hour duration. The initial temperature of reactor was approximately 25° C.

The percentage yield of chloramine in the various runs was calculated according to the following equation:

$$\text{Percent yield of ClNH}_2 = \frac{a-b}{\frac{1}{2}a} \times 100$$

where $a$=total weight of chlorine entering the reactor, and $b$=weight of chlorine retained in the reactor as ammonium chloride. This formula arises from the fact that if the reaction proceeds completely according to Equation 1 above, the yield of chloramine will be 100%, and 50% of the chlorine will remain in the reactor as ammonium chloride. However, if the reaction proceeds completely to yield nitrogen in accordance with Equation 2 the yield of chloramine will be 0%, and all the chlorine will be retained as ammonium chloride in the reactor.

The results of a series of runs at various ammonia to chlorine ratios, with and without nitrogen diluent for the chlorine, are summarized in Table 1 hereafter.

Table 1
SYNTHESIS OF CHLORAMINE

| Duration of Reaction | Mole Ratio, $NH_3/N_2/Cl_2$ | Percent Yield $ClNH_2$ | Duration of Reaction | Mole Ratio, $NH_3/N_2/Cl_2$ | Percent Yield $ClNH_2$ |
|---|---|---|---|---|---|
| 1 hr | 32.5/3.25/1 | 78.8 | 15 min | 14/2.9/1 | 81.4 |
| 1 hr | 30/3.55/1 | 84.3 | 15 min | 10.5/3.2/1 | 85.2 |
| 1 hr | 22.5/3.35/1 | 64.4 | 15 min | 5.6/3.4/1 | 83.5 |
| 1 hr | 18/3.6/1 | 80.5 | 15 min | 2.7/3.2/1 | 76.6 |
| 1 hr | 9.6/5.5/1 | 49.7 | 15 min | 15/0/1 | 80.0 |
| 15 min | 27/2.7/1 | 92.8 | 15 min | 10.4/0/1 | 70.0 |
| 15 min | 24/2.8/1 | 88.8 | 15 min | 11/0/1 | 80.3 |
| 15 min | 20/3.0/1 | 92.8 | 15 min | 5/0/1 | 51.8 |
| 15 min | 15/3/1 | 78.8 | 15 min | 2.7/0/1 | 34.6 |
| 15 min | 14/2.9/1 | 84.0 | 15 min | 2.5/0/1 | 18.0 |

An examination of the data in Table 1 indicates very clearly that there are other variables than those listed in the table which affect the yield of chloramine for the data presented show a considerable amount of "scatter." The data do, however, provide ample support for the following general conclusions:

(1) It is clear that an excess of ammonia over the theoretical stoichiometric equivalent of the chlorine favors the formation of chloramine.

(2) The addition of nitrogen gas to the chlorine stream prior to its introduction into the reactor tends to improve the yield of chloramine, but good yields of chloramine were obtained without such nitrogen addition and at moderate ammonia to chlorine ratios.

(3) Runs of one hour duration tended to give somewhat lower yields of chloramine than runs lasting only 15 minutes. This fact combined with an observation that the rate of evolution of water-insoluble gas ($N_2$) increases as any given reaction proceeds leads us to conclude that the gradual build-up of ammonium chloride deposits around the chlorine inlet and in the reaction zone tends to reduce the yield of chloramine.

EFFECTS OF GAS FLOW RATE AND OF JET DESIGN

It was thought that the beneficial effects of diluting the stream of chlorine gas wtih nitrogen might be achieved by use of a chlorine jet through which the chlorine gas could be introduced into the ammonia atmosphere at very high velocities and thus insure rapid mixing with an excess of ammonia. Further, it was hoped that such a device would not clog with ammonium chloride and would thus make unnecessary the ram-rod technique described above. Equipment designed to meet this objective was fitted with replaceable platinum spinnerettes, having hyperbolic openings of 0.0018 in., 0.0031 in., and 0.0043 in. diameter. The ammonia inlet was also designed to provide uniform distribution of ammonia gas around the chlorine inlet. It was found that with this apparatus, the reaction could be run almost indefinitely without clogging the jet; however, a cone of ammonium chloride grew out from the hole in the spinnerette. It was found further that the reactor in the vicinity of the reaction zone became quite warm, and, in those instances where low yields of chloramine are obtained, a yellow-white flame could be observed at the opening in the spinnerette. Furthermore, the appearance of the flame coincided with a drop in the rate of chloramine production and with an increase in the rate of nitrogen evolution.

The percentage yields of chloramine from several 15 minute runs using three different spinnerettes without diluent gas are listed in Table 2.

Table 2
PERCENTAGE YIELD OF CHLORAMINE

| Spinnerette Size | Mole Ratio, $NH_3/Cl_2$ | Percent Yield $ClNH_2$ |
|---|---|---|
| 0.0018 in | 9:1 | 5.0 |
|  | 18:1 | 75.0 |
|  | 22:1 | 74.2 |
|  | 30:1 | 42.9 |
|  | 39:1 | 94.1 |
| 0.0031 in | 7.8:1 | 10.2 |
|  | 13.8:1 | 64.9 |
|  | 21.4:1 | 92.5 |
|  | 23.6:1 | 90.9 |
|  | 32.8:1 | 94.0 |
| 0.0043 in | 12.8:1 | 86.0 |

The results shown in Table 2 indicate definitely that the molar ratio of ammonia to chlorine is not the sole determining factor on the chloramine yield. There is definite indication that, at corresponding mole ratios of ammonia to chlorine, better yields of chloramine are obtained with larger spinnerette openings than with the smaller. We believe that this results from the fact that decreasing the size of the spinnerette opening results in a decrease in the rate of gas flow (for a given $NH_3/Cl_2$ ratio) down the tube away from the reaction zone. At these lower flow rates there is a relatively greater opportunity for chloramine molecules produced in the primary reaction of chlorine and ammonia to be carried back into the reaction zone, and to be further oxidized, eventually yielding nitrogen. This oxidation of chloramine to nitrogen causes a sharp decrease in total gas volume in accordance with the following equation:

$$6NH_3(g) + NH_2Cl(g) + 2Cl_2(g) \rightarrow N_2(g) + 5NH_4Cl(s) \quad (3)$$

This causes a further sharper reduction in gas flow which produces more oxidation, so that the effect pyramids. Thus, the total rate of gas flow in the reactor tube away from the chlorine jet is believed to be of primary importance in determining the yield of chloramine.

In order to check this conclusion, total rates of gas flow in the reactor for the experiments listed in Table 2 were recalculated taking into consideration the decrease in gas volumes resulting from reactions (1) and (2). (It should be noted that reaction (2) is the summation of reaction (1) and reaction (3)). It is clear that reaction (1) results in a decrease of two volumes of gas per mole of chlorine reacted and that reaction (2) corresponds to a decrease of three and one third volumes of gas per mole of chlorine reacted. Proper corrections for these decreases in volume were made on the basis of the percentage yield of chloramine—thus yielding an average rate of flow for the period of the reaction. The data thus obtained are plotted in the figure of the drawing, which shows that the data obtained at a variety of ammonia to chlorine ratios and using the different spinnerettes fall along a smooth curve except for two points, both of which correspond to higher chloramine yields than predicted from the curve.

To further test this conclusion, two runs using the 0.0031 in. spinnerette at the very low mole ratios of 7.9 to 1 and 3.9 to 1 were carried out, but with the addition in each case of sufficient nitrogen to give a total gas flow of 13 moles per hour. It should be emphasized that the nitrogen was not added as a diluent to the chlorine stream but was added to the ammonia. The yields of chloramine obtained were 83% and 68% respectively.

The data in Table 2 show that without the added nitrogen to increase the rate of flow, a yield of chloramine of only 10.2% was obtained with the 0.0031 in. spinnerette at a mole ratio of 7.8 to 1. These results support our conclusion that the rate of flow of gases away from the reaction zone is a factor of primary importance in determining chloramine yields.

We claim:
1. A process of preparing substantially anhydrous chloramine which consists of introducing substantially anhydrous gaseous chlorine into substantially anhydrous gaseous ammonia in a ratio providing substantially more than two moles of ammonia to each mole of chlorine whereby there is formed a gaseous mixture of chloramine and unreacted ammonia containing suspended solid ammonium chloride, and moving the reaction mixture away from the point of chlorine introduction to avoid prolonged contact between unreacted chlorine and gaseous chloramine.

2. A process of preparing anhydrous chloramine which consists of rapidly mixing anhydrous gaseous chlorine diluted with an inert gas into anhydrous gaseous ammonia in a ratio providing a substantial excess of ammonia over the ratio of two moles of ammonia for each mole of chlorine to produce substantially anhydrous chloramine whereby there is formed a gaseous mixture comprising chloramine and unreacted ammonia having solid ammonium chloride dispersed therein, removing said ammonium chloride immediately upon its formation to minimize contact between the gaseous products and said ammonium chloride and moving said gaseous products away from the area of chlorine addition whereby contact between unreacted chlorine and chloramine is avoided.

3. The method of forming anhydrous chloramine comprising the steps of providing a stream of anhydrous ammonia in a reaction zone, adding to said stream of ammonia gaseous anhydrous chlorine in an amount to maintain a ratio of ammonia to chlorine greater than 10:1, whereby there is formed solid ammonium chloride suspended in a gaseous mixture of chloramine in unreacted ammonia, continuously removing the reaction products from said zone, separating the solids in said products to yield a mixture of chloramine in ammonia.

4. The method of producing anhydrous mono-chloramine comprising the steps of advancing a body of anhydrous gaseous chlorine through a reaction zone, introducing anhydrous gaseous ammonia into said body of chlorine in an amount in excess of ten moles of ammonia per mole of chlorine to form chloramine and ammonium chloride in anhydrous ammonia, moving the resulting ammonia-rich mixture away from the chlorine inlet to prevent mixing of said chloramine with chlorine, and separating said ammonium chloride from said stream of gaseous materials to form a mixture of chloramine and anhydrous ammonia.

5. The method of producing anhydrous chloramine comprising providing an elongated reaction zone, introducing anhydrous gaseous chlorine axially into said zone, introducing anhydrous gaseous ammonia into said zone at a point adjacent the chlorine inlet and in a direction parallel with said axially introduced chlorine in an amount to provide an ammonia to chlorine ratio of more than 10:1 and in a manner to cause rapid mixing of the chlorine and ammonia but to prevent back diffusion of the reaction products to the chlorine inlet thereby avoiding mixing of the chloramine with chlorine, and separating the solid reaction products from the stream to yield an anhydrous gaseous mixture of mono-chloramine in ammonia.

6. Invention of claim 5 wherein the ratio of $NH_3$ to $Cl_2$ is between 2:1 and 200:1.

7. The method of preparing anhydrous monochloramine in high yields comprising rapidly dispersing gaseous anhydrous chlorine into at least a ten-fold molar quantity of gaseous medium comprising a substantial excess of gaseous anhydrous ammonia above two mols of ammonia per mol of chlorine as the only component having reactivity towards chlorine, whereby chloramine and solid ammonium chloride are formed, and immediately removing the chloramine-containing mixture from said reaction zone to avoid between unreacted chlorine and said chloramine.

8. The method of preparing anhydrous monochloramine in high yields comprising rapidly dispersing gaseous anhydrous chlorine into gaseous anhydrous ammonia in a ratio of at least 10 mols of ammonia per mol of chlorine, to form solid ammonium chloride dispersed in gaseous chloramine and unreacted ammonia, immediately removing the reaction products from the zone of reaction to prevent contact of the formed monochloramine with unreacted chlorine, and removing said solid ammonium chloride from said gaseous mixture to yield a gaseous mixture of monochloramine and unreacted ammonia.

9. The method of forming anhydrous monochloramine comprising providing a stream of anhydrous ammonia advancing through a reaction zone, continuously introducing gaseous anhydrous chlorine into said stream in an amount to maintain a mol ratio of ammonia to chlorine above 10:1 and in a manner to provide immediate mixing of said chlorine with said ammonia and a minimum of contact between unreacted chlorine and chloramine, and removing the resulting solid ammonium chloride from said stream to yield a gaseous mixture of chloramine and ammonia.

10. The method of claim 9 wherein the mol ratio of ammonia to chlorine is maintained between 10:1 and 200:1.

References Cited in the file of this patent

UNITED STATES PATENTS

| | | |
|---|---|---|
| 910,858 | Raschig | Jan. 26, 1909 |
| 1,581,115 | Harold | Apr. 20, 1926 |
| 1,850,057 | Baker et al. | Mar. 15, 1932 |
| 2,118,904 | Staudt et al. | May 31, 1938 |

FOREIGN PATENTS

| | | |
|---|---|---|
| 22,957 | Great Britain | 1907 |